(12) United States Patent
Furman et al.

(10) Patent No.: US 10,216,643 B2
(45) Date of Patent: Feb. 26, 2019

(54) OPTIMIZING PAGE TABLE MANIPULATIONS

(71) Applicant: International Business Machines Corporation, Armonk, NY (US)

(72) Inventors: Deborah A. Furman, Staatsburg, NY (US); Marco Kraemer, Sindelfingen (DE); Dale F. Riedy, Poughkeepsie, NY (US); Anthony T. Sofia, Highland, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 545 days.

(21) Appl. No.: 14/949,331

(22) Filed: Nov. 23, 2015

(65) Prior Publication Data

US 2017/0147500 A1 May 25, 2017

(51) Int. Cl.
*G06F 12/00* (2006.01)
*G06F 13/00* (2006.01)
(Continued)

(52) U.S. Cl.
CPC ...... *G06F 12/1009* (2013.01); *G06F 12/1027* (2013.01); *G06F 12/1045* (2013.01); *G06F 12/1081* (2013.01); *G06F 2212/683* (2013.01)

(58) Field of Classification Search
CPC .......................... G06F 12/1009; G06F 12/1027
(Continued)

(56) References Cited

U.S. PATENT DOCUMENTS 6,490,671 B1 12/2002 Frank
7,219,209 B2 5/2007 Essick
(Continued)

FOREIGN PATENT DOCUMENTS

JP 2008077642 4/2008

OTHER PUBLICATIONS

Chen et al., Accelerator-Rich CMPs: From Concept to Real Hardware, IEEE, 2013, 8 pages.
(Continued)

*Primary Examiner* — Edward J Dudek, Jr.
*Assistant Examiner* — Sidney Li
(74) *Attorney, Agent, or Firm* — Cantor Colburn LLP

(57) ABSTRACT

A computer program product for optimizing page table manipulations is provided and includes a computer readable storage medium having program instructions that are readable and executable by a processing circuit to cause the processing circuit to create and maintain a translation table with a translation look-aside buffer (TLB) disposed to cache priority translations, update the translation table upon de-registration of a DMA address, allocate entries in the translation table from low to high memory addresses during memory registration, maintain a cursor for identifying where to search for available entries upon performance of a new registration, advance the cursor from entry-to-entry in the translation table and wrap the cursor from an end of the translation table to a beginning of the translation table and issue a synchronous TLB invalidation instruction to invalidate the TLB upon at least one wrapping and an entry being identified and updated.

20 Claims, 9 Drawing Sheets

(51) Int. Cl.
　　　*G06F 13/28*　　　(2006.01)
　　　*G06F 12/1009*　　(2016.01)
　　　*G06F 12/1045*　　(2016.01)
　　　*G06F 12/1081*　　(2016.01)
　　　*G06F 12/1027*　　(2016.01)

(58) Field of Classification Search
　　　USPC .......................................................... 711/207
　　　See application file for complete search history.

(56)　　　　　　　　References Cited

U.S. PATENT DOCUMENTS

| 8,412,911 | B2 | 4/2013 | Grohoski |
| 2001/0044889 | A1* | 11/2001 | James ................. G06F 12/1027 |
| | | | 711/206 |
| 2009/0228743 | A1* | 9/2009 | Ponnuswamy ..... G06F 12/1027 |
| | | | 714/48 |
| 2012/0102273 | A1 | 4/2012 | Chang |
| 2014/0149677 | A1 | 5/2014 | Jayasena |

OTHER PUBLICATIONS

Kaiser et al., Synchronization of TLB Invalidate Broadcasts using a TLBSYNC Command; ip.com; Mar. 27, 2005, 3 pages.

* cited by examiner

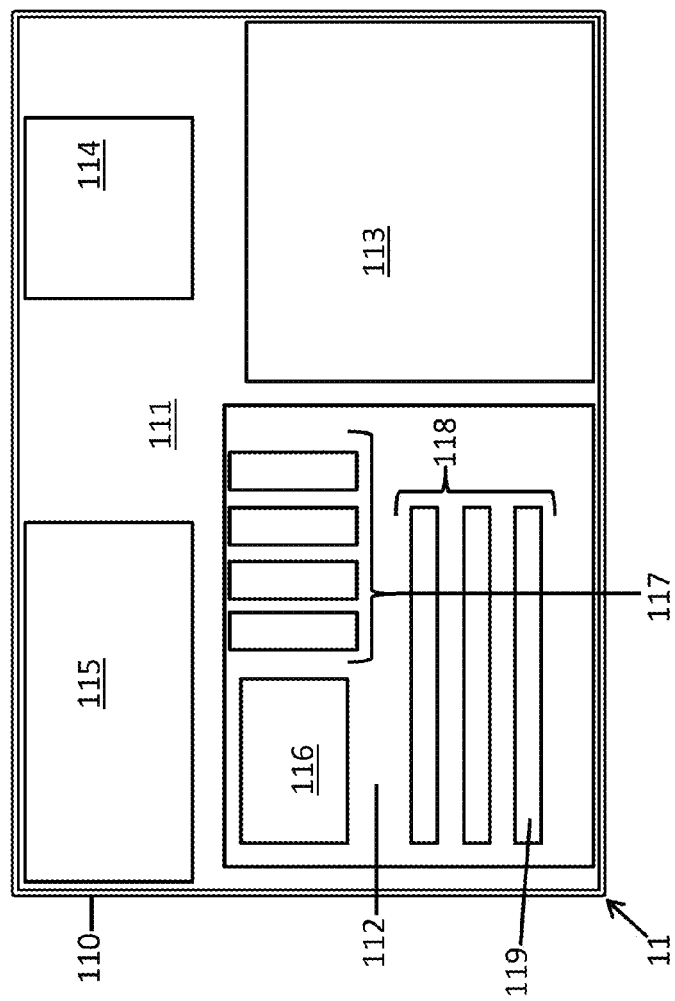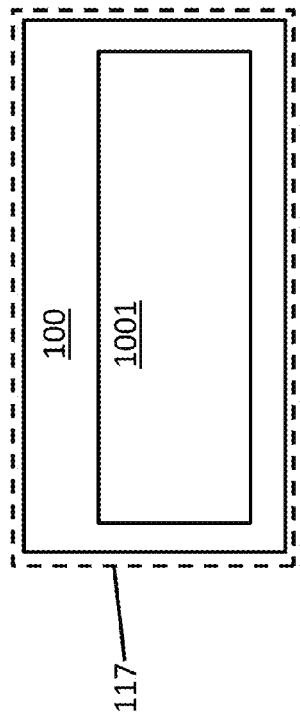

OPTIMIZING PAGE TABLE MANIPULATIONS

BACKGROUND

The present invention relates to optimizing page table manipulations and, more specifically, to methods of optimizing page table manipulations for high frequency callers with multiple page tables.

In a computing system where memory is shared between a host and an off-board accelerator card there are setup procedures that need to be executed in order to allow the accelerator card to access host memory. In the case of the accelerator card, direct memory access (DMA) is used to allow the accelerator card to read and write into the host's main memory.

The virtual memory addresses used for the accelerator card are setup by the host and then requests will be sent to the accelerator card to perform functions using these DMA addresses. The corresponding host architecture must provide for creation and maintenance of a translation table that is used to translate DMA addresses to real addresses. The computer hardware that is responsible for mapping DMA addresses to real addresses may be on the accelerator card itself, on the chip with the CPUs/processor cores or somewhere in between such as an input/output (I/O) fan-out card. The hardware may provide for a translation look-aside buffer (TLB) that is used to cache the most recently or frequently referenced translations. This improves performance by allowing the hardware to quickly resolve DMA addresses without having to access the translation table itself in host memory. If a TLB is provided, an instruction must also be provided to allow the host to invalidate (purge) these cached entries when the host memory is no longer being used for accelerator card requests. This prevents the accelerator card from accidently accessing real memory locations that have been reassigned for another purpose.

At a minimum, the hardware must provide a synchronous form of this instruction, which means that when control is returned to the program that executed the instruction, the TLB entries associated with the host memory have been invalidated. The instruction may allow a single address, a range of addresses or a list of addresses to be invalidated. The hardware may also optionally provide an asynchronous form of the instruction, where a request to invalidate the TLB entries is initiated, but may or may not have completed by the time control is returned to the program that executed the instruction. To ensure that the TLB entries have been invalidated, in this case, the asynchronous instruction must be followed by a synchronous form of the instruction some time before the DMA address is reused. This will guarantee that all in-process asynchronous invalidate requests have completed.

In the case of System z architecture, the Refresh PCIE Translation (RPCIT) instruction is provided to invalidate entries in TLB. On the zEC12 and zBC12 processors, only the synchronous form of the instruction is supported. However, on the z13 processors, the asynchronous form of the instruction is also supported.

It is expected that applications are provided with an application programming interface (API) for setting up memory (register), submitting requests and cleaning up the memory (de-register). The operation of registering memory involves updating the translation table whereas the de-registration operation requires the translation table to be updated AND any entries in the TLB be invalidated. This invalidation operation requires the RPCIT instruction to be executed for the areas in the translation table that are to be invalidated.

This can be costly for two reasons in particular. The first of these reasons is that the RPCIT instruction can be costly in terms of CPU cycles, especially when the synchronous form of the instruction is issued. Additionally, multiple RPCIT instructions may need to be issued to purge non-contiguous memory address ranges. The second reason is that, if multiple accelerator card are sharing the same memory space (and therefore the same translation table), then an RPCIT would be required for each accelerator. There is significant value in having all accelerators share the same memory space as for recovery since a single request can be re-driven on a different device without the need to re-register the memory.

SUMMARY

According to an embodiment of the present invention, a computer program product for optimizing page table manipulations is provided. The computer program product includes a computer readable storage medium having program instructions embodied therewith. The program instructions are readable and executable by a processing circuit to cause the processing circuit to create and maintain a translation table for translating direct memory access (DMA) addresses to real addresses with a translation look-aside buffer (TLB) disposed to cache priority translations, update the translation table upon de-registration of a DMA address without issuance of a corresponding TLB invalidation instruction, allocate entries in the translation table from low to high memory addresses during memory registration, maintain a cursor for identifying where to search for available entries upon performance of a new registration, advance the cursor from entry-to-entry in the translation table and wrap the cursor from an end of the translation table to a beginning of the translation table and issue a synchronous TLB invalidation instruction to invalidate an entirety of the TLB upon at least one wrapping of the cursor and an entry being identified and updated.

According to another embodiment of the present invention, a computing system for optimizing page table manipulations is provided. The computing system includes a computer readable storage medium having instructions stored thereon that are executable by a processing circuit to cause the processing circuit to create and maintain a translation table for translating direct memory access (DMA) addresses to real addresses with a translation look-aside buffer (TLB) disposed to cache priority translations, update the translation table upon de-registration of a DMA address without issuance of a corresponding TLB invalidation instruction, allocate entries in the translation table from low to high memory addresses during memory registration, maintain a cursor for identifying where to search for available entries upon performance of a new registration, advance the cursor from entry-to-entry in the translation table and wrap the cursor from an end of the translation table to a beginning of the translation table and issue a synchronous TLB invalidation instruction to invalidate an entirety of the TLB upon at least one wrapping of the cursor and an entry being identified and updated.

According to yet another embodiment of the present invention, a computer-implemented method for optimizing page table manipulations is provided and includes creating and maintaining a translation table for translating direct memory access (DMA) addresses to real addresses with a translation look-aside buffer (TLB) disposed to cache priority translations, updating the translation table upon deregistration of a DMA address without issuance of a corresponding TLB invalidation instruction, allocating entries in the translation table from low to high memory addresses during memory registration, maintaining a cursor for identifying where to search for available entries upon performance of a new registration, advancing the cursor from entry-to-entry in the translation table and wrap the cursor from an end of the translation table to a beginning of the translation table and issuing a synchronous TLB invalidation instruction to invalidate an entirety of the TLB upon at least one wrapping of the cursor and an entry being identified and updated.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 is a schematic diagram of an interior of a computing device;

FIG. 3 is a schematic drawing of a computer program product;

DETAILED DESCRIPTION

As will be described below, methods for managing translation tables are provided. The methods include allocating slots of a translation table such that the entire table only needs to be refreshed periodically rather than for individual requests, allocating slots of a translation table such that an asynchronous variety of the RPCIT instruction with an intermittent synchronization can be used to keep the TLB in-sync and intelligently choosing which specific acceleration devices require an invalidation of their TLB based on where requests for specific memory ranges where performed. The methods provide performance optimization in an environment where an acceleration device is being used to obtain improved application performance. For the first two of the methods, an underlying assumption is that when a program deregisters memory, the accelerator has completed any DMA accesses for the host memory locations associated with the program requests. That is, the hardware will never see another request for that DMA address until a new host memory address is registered using that DMA address. The registration and deregistration APIs can provide their own protection for cases where an application pre-maturely de-registers memory.

Figure 1:
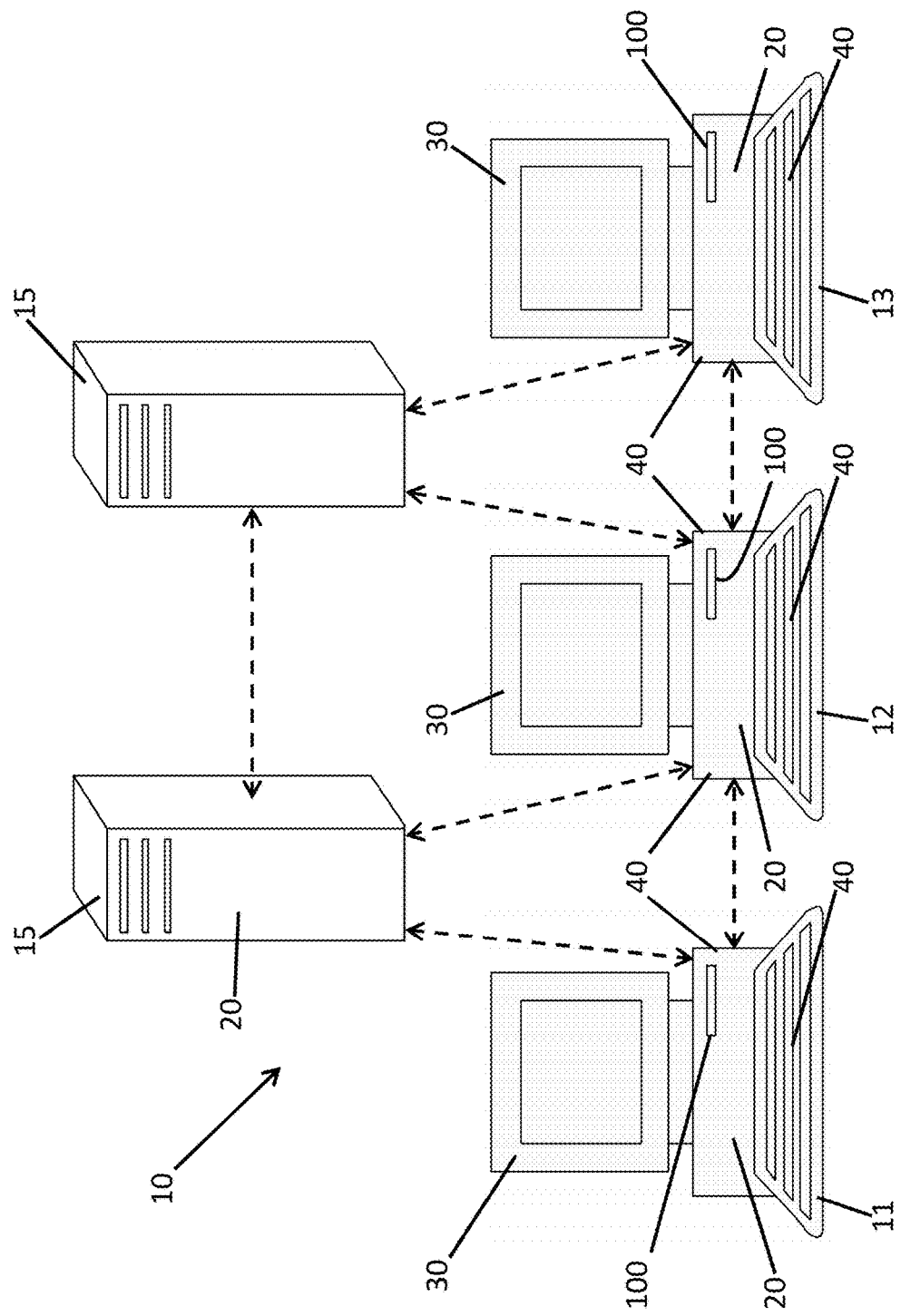
FIG. 1 is a schematic illustration of a computing system.

With reference to FIG. 1, a computing system 10 is provided and may be configured for example as an enterprise computing system or as a personal computing system. In either case, the first computing system 10 includes first, second and third computing devices 11, 12 and 13 and servers 15 which are configured to be networked together for communication purposes. Each of the first, second and third computing devices 11, 12 and 13 and the servers 15 may include among other features a processing circuit 20, a display 30, user input devices 40 and a networking unit as well as a computer program product 100 for optimizing page table manipulations.

The processing circuit 20 may be provided as a microprocessor, a central processing unit (CPU) or any other suitable processing device. The display 30 may be provided as a monitor and is configured to display data and information as well as a graphical user interface to an administrator or user. The user input devices 40 may be provided as a mouse and a keyboard combination and are configured to allow the administrator or user to input commands to the processing circuit 20. The networking unit may be provided as an Ethernet or other suitable networking device by which the first, second and third computing devices 11, 12 and 13 and servers 15 are communicative.

With reference to FIG. 2, a structure and an interior of one of the computing devices 11, 12 and 13 and the servers 15 are illustrated. For the purposes of clarity and brevity, the structure and the interior will be that of the computing device 11 although it is to be understood that any of the computing devices 11, 12 and 13 and the servers 15 could have been chosen for discussion. As shown in FIG. 2, the computing device 11 includes a housing 110 having a bottom portion, sidewalls and a lid formed to define an interior 111. The computing device 11 further includes a motherboard 112, a hard disk drive (HDD) 113, a fan 114 for generating a cooling air flow in the interior 111 and a power supply unit 115 for providing power to the computing device 11. A central processing unit (CPU) 116, a memory unit 117 and at least one or more removable cards 118 are operably installed on the motherboard.

The at least one or more removable cards 118 may include an accelerator device, such as a hardware accelerator card 119. The hardware accelerator card 119 serves as computer hardware that performs some functions (e.g., data compression) faster than software running on the CPU 116. The increased speed is due to several factors including, but not limited to, the fact that the hardware accelerator card 119 operates concurrently with the CPU 116 (as opposed to the sequential operation of the CPU 116). In any case, the hardware accelerator card 119 is configured to handle certain types of data compression requests and, in particular, may be configured and disposed to handle relatively large data compression requests and to do so at a relatively high level of efficiency. That is, a throughput of the hardware accelerator card 119 is or may be substantially higher than that of the CPU 116 for a similar data compression execution. This efficiency is important to note because there are time and processing costs associated with sending data compression requests to the hardware accelerator card 119 from the CPU 116. These time and processing costs are amortized over the time required to execute the relatively large data compression requests.

With reference to FIG. 3, the computer program product 100 includes a computer readable storage medium 1001 and may be installed in the memory unit 117 of the computing device 11 as firmware or as lower level executable program instructions.

Figure 4:
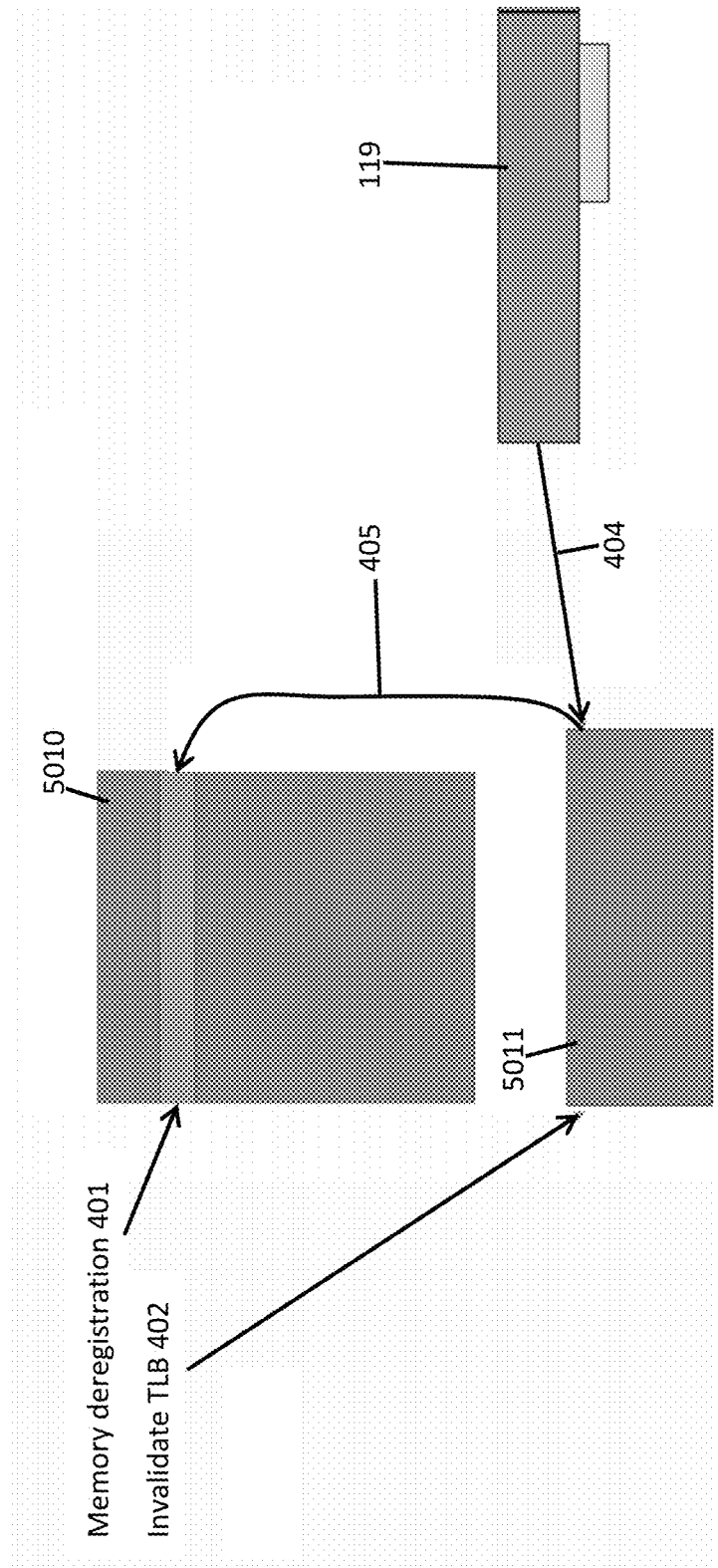
FIG. 4 is a schematic diagram of a conventional layout of a translation table and translation look-aside buffer (TLB)
Figure 5:
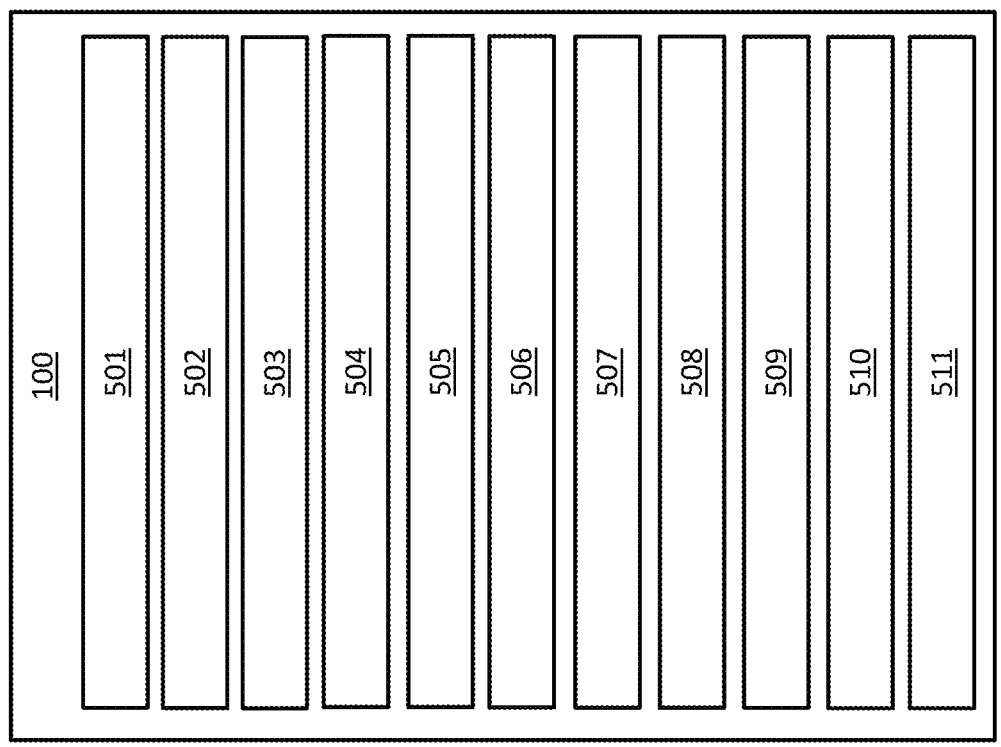
FIG. 5 is a schematic diagram of a computer program product for managing page table manipulations.

With reference to FIG. 4, a conventional method for purging a TLB of invalidated entries is to perform this task on each memory deregistration event for the TLB entries involved in de-registration. That is, as shown in FIG. 4, a memory de-registration operation updates the DMA translation table in host memory 401 to invalidate an entry in the TLB 402. The TLB is thus purged of any occurrences of this host memory address and software de-registration is complete. Subsequently, as a result of an accelerator device (e.g., accelerator card 119 of FIG. 2) wanting to access a memory location, a lookup is performed to a translation mechanism with a TLB 404. The translation mechanism will then check its TLB for the requested lookup 405. In such cases for an address translation that is not currently cached, such as one that was purged, the translation mechanism will access a translation in a DMA translation table (e.g., translation table 5010 to be discussed below) in host memory and, if the translation in the host memory is not valid (i.e., it is not mapped to a real address), no update is performed in the TLB and the lookup fails.

While the process described with reference to FIG. 4 works well, the processing can become burdensome when the frequency of the caller increases. The methods for managing translation tables are thus provided herein to address the drawbacks of the conventional method of FIG. 4. Of these methods, it is to be understood that the first two are at least partially based on the following allocation scheme for DMA translation tables: (1) translation table entries are allocated from low to high memory addresses during memory registration, a global cursor used by all memory registration callers is maintained to keep track of the last free (next free or last allocated) entry and when a new registration is performed the search for available entries resumes at this point, (2) a single registration may require multiple entries in the translation table, for example, if each entry in the translation table points to a 4 KB area in host memory and the memory registration is for 16 KB then four entries would be required, (3) when multiple entries are required they can be either contiguously allocated in the translation table or not, depending on the requirements of the caller, (4) when the end of the table is reached the search for available entries will resume at the origin of the table and (5) multiple callers may be searching and updating entries concurrently.

In a general sense, with reference to FIGS. 5-10, the method for managing translation tables includes first-eleventh program instructions 501-511. When executed, the first program instructions 501 cause the processing circuit 20 (e.g., the processing circuit 20 of any of the first, second and third computing devices 11, 12 and 13 or the servers 15) to create and maintain a translation table 5010 (see FIG. 4) for translating direct memory access (DMA) addresses to real addresses in host memory with a translation look-aside buffer (TLB) 5011 (see FIG. 4) that is disposed to cache priority translations. When executed, the second-sixth program instructions 502-506 cause the processing circuit 20 to update the translation table upon de-registration of a DMA address without issuance of a corresponding TLB invalidation instruction, allocate entries in the translation table from low to high memory addresses during memory registration, maintain a cursor for identifying where to search for available entries upon performance of a new registration, advance the cursor from entry-to-entry in the translation table and wrap the cursor from an end of the translation table to a beginning of the translation table and issue a synchronous TLB invalidation instruction to invalidate an entirety of the TLB upon at least one wrapping of the cursor and an entry being identified and updated.

In accordance with further embodiments, when executed, the seventh-eleventh program instructions 507-511 cause the processing circuit 20 to issue an asynchronous TLB invalidation instruction upon de-registration of a DMA address and to delay issuance of the synchronous TLB invalidation instruction until a first registration following the at least one wrapping, to map host memory and DMA address translations for all host memory areas provided to each of multiple callers, to add device usage information to the host memory and DMA address translations and to issue the asynchronous TLB invalidation instruction in accordance with the device usage information. In accordance with still further embodiments, the device usage information may include a single device identifier and a bit mask and may be initialized during a new registration and updated when requests are issued to a corresponding one of multiple callers.

Figure 6:
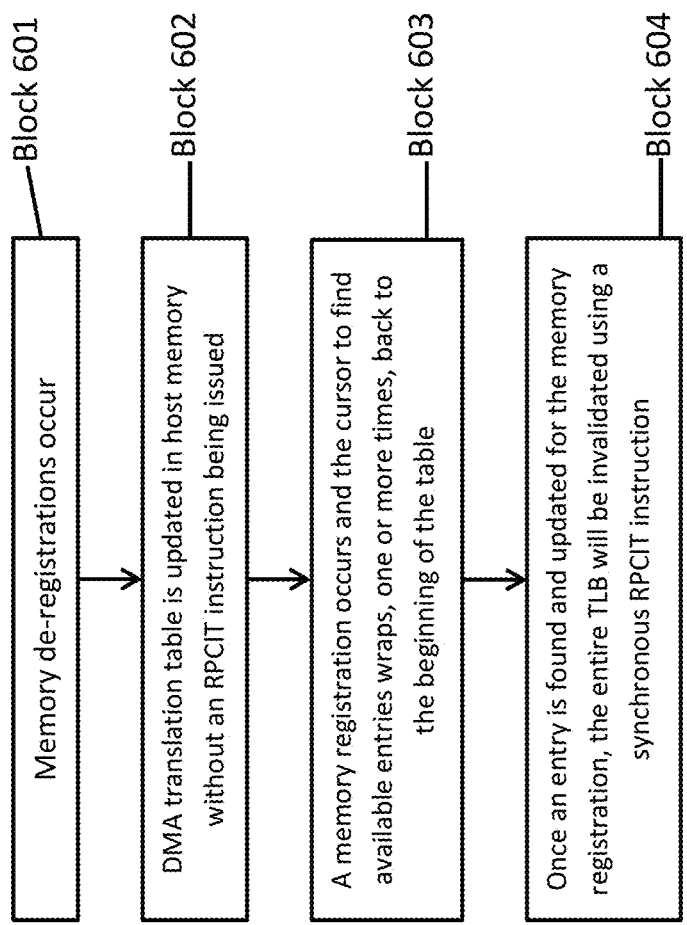
FIG. 6 is a schematic diagram of a computer program product for managing page table manipulations in accordance with embodiments.

In greater detail, in the first of the methods for managing translation tables, a single RPCIT instruction will be performed on a table wrap with reference to FIG. 6. As shown in FIG. 6, memory de-registrations occur at block 601 and a DMA translation table is updated in host memory without an RPCIT instruction being issued at block 602. Then, a memory registration occurs and the cursor to find available entries wraps, one or more times, back to the beginning of the table at block 603. Once an entry is found and updated for the memory registration, the entire TLB will be invalidated using a synchronous RPCIT instruction at block 604. This single RPCIT instruction will always bring the entire TLB back into a consistent state as no entry can be re-used until a memory registration has its search cursor wrap back to the beginning of the table. In the event where multiple memory registrations are running concurrently they may all observe that the cursor has wrapped, in this case all memory registrations will issue the RPCIT instruction to fully refresh the TLB.

Figure 7:
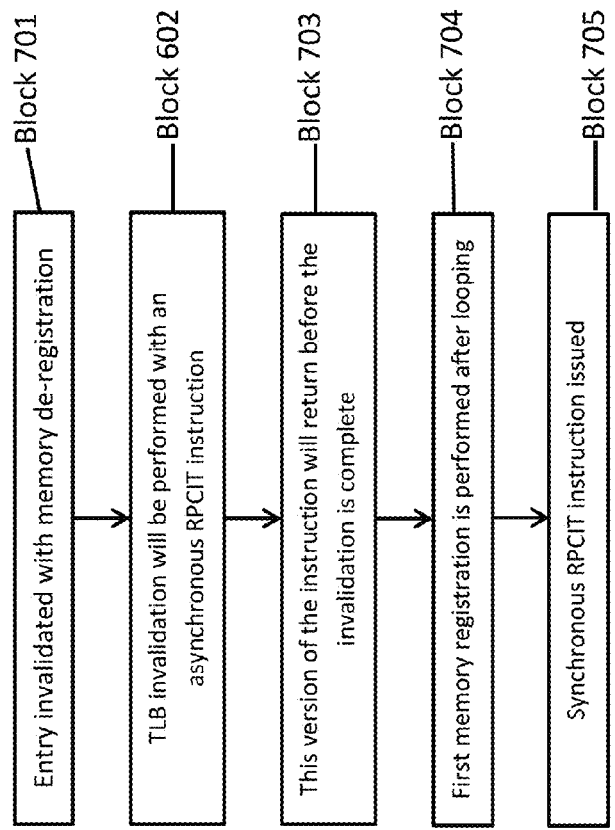
FIG. 7 is a schematic diagram of a computer program product for managing page table manipulations in accordance with further embodiments.

In the second of the methods, an asynchronous RPCIT is exploited to target specific memory areas with a periodic synchronous RPCIT to guarantee all asynchronous requests are complete with reference to FIG. 7. As shown in FIG. 7, in the second method, the allocation of slots in the DMA table will be the same as in the first method in that they will be allocated from low to high and looping back to the beginning as described above. With this in mind, when an entry is invalidated with a memory de-registration at block 701, the TLB invalidation will be performed with an asynchronous RPCIT instruction at block 702. This version of the instruction will return before the invalidation is complete at block 703. When the first memory registration is performed after looping at block 704, a synchronous RPCIT instruction will be issued at block 705.

This process will have the following effects: (1) the synchronous version of the instruction will be delayed until all outstanding asynchronous requests have completed so as to effectively synchronize any outstanding TLB invalidation (since the DMA table allocation is circular, no DMA table entry will be re-used until the allocation cursor wraps, which triggers this event), (2) the DMA table entries that were allocated by this registration request would already have had an asynchronous RPCIT issued for them and, in most cases, by the time the cursor wraps back to the start of the DMA table, the asynchronous RPCITs would have completed and the TLB entries would have been invalidated (issuing the synchronous form of the instruction guarantees that this has occurred.

The second method has an advantage over the first method because each asynchronous RPCIT instruction is only invalidating the specific TLB entries that are associated with memory de-registrations. The entire DMA namespace is never invalidated from the TLB. In the event where multiple memory registration callers loop to the origin of the table to find free entries, the same method as above can be used such that only one of the callers must issue the synchronous RPCIT instruction. Multiple callers may have to issue the instruction in the event of parallel executions of multiple registrations so that all parallel memory registrations that wrap will re-sync using the RPCIT instruction.

The third method handles the event when a single host DMA translation table is used by multiple accelerator cards that each have access to a single TLB. The third method leverages the fact that for each request to the accelerator card, a translation from a host memory address to a DMA address must be performed for all memory areas that are provided to the accelerator card. For example, a structure such as the table illustrated in FIG. 7 can be maintained to perform memory mapping.

Figure 8:
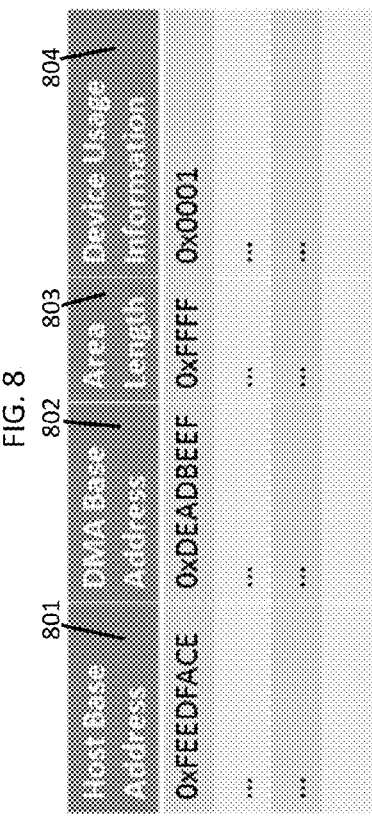
FIG. 8 is a schematic illustration of fields of a mapping structure for use in the computer program product of FIGS. 5-7 in accordance with embodiments.

As shown in FIG. 8, the table includes host base address fields 801, DMA base address fields 802, area length field 803 and device usage information fields 804, which are added to the memory mapping by the third method. The device usage information can include, but is not limited to: (1) a single device identifier, which identifies a single device where a request was submitted with the registered memory, and a validity flag (if the memory area is used by multiple devices then the validity flag would be turned off and an RPCIT would need to be issued to all acceleration devices that shared the DMA table during memory de-registration) and (2) a bit mask representing all accelerator devices in the system where an index maps directly to a table in system memory that contains information about each device (this would then allow multiple devices to use the memory and when de-registration processing is performed only those devices would have the RPCIT instruction issued against it).

The device usage information fields 804 would be initialized during memory registration processing and then updated when requests are submitted to (or assigned to) the accelerator card.

Figure 9:
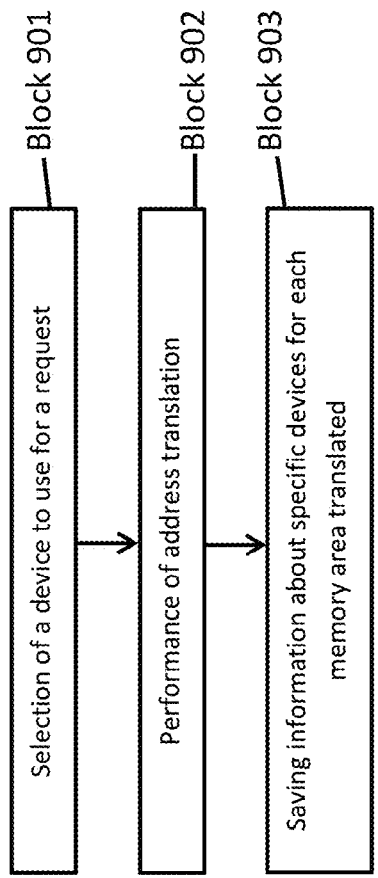
FIG. 9 is a schematic diagram of a computer program product for managing page table manipulations in accordance with further embodiments.

With reference to FIG. 9, third method processing includes device selection for a request at block 901, where the request has several memory areas associated with it and each needs to be translated to a device address, address translation at block 902 and, for each memory area translated, information about the specific devices is saved at block 903. In accordance with embodiments, the selection can be weighted based on hints provided as a result of a previous request. This would provide potential further optimization where, if latency was equal among all devices, a same device that was selected for a previous request that used this memory (as saved at block 903) could avoid additional RPCIT instructions for additional devices.

Figure 10:
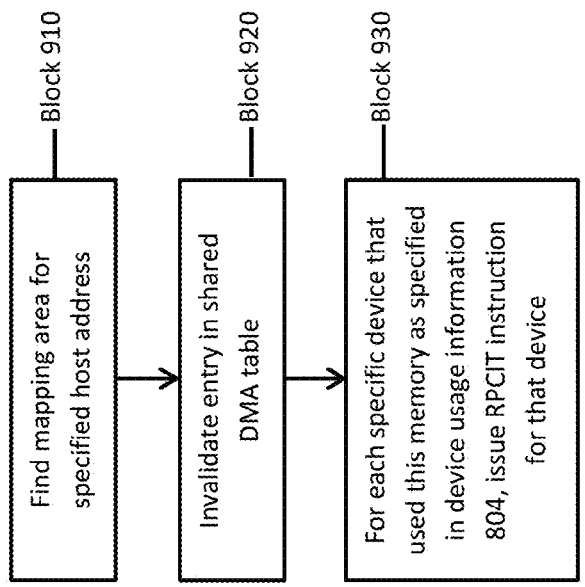
FIG. 10 is a schematic diagram of a computer program product for managing page table manipulations in accordance with further embodiments.

Then, with reference to FIG. 10, during de-registration processing, the saved information could be used to target the RPCIT instructions to the appropriate devices. That is, at block 910, a mapping area for a specified host address is found, at block 920, the entry is invalidated in the shared DMA table, and, at block 930, for each specific device that used this memory as specified in the device usage information fields 804, and the RPCIT instruction is issued for that device. This eliminates the overhead of memory de-registration as more acceleration cards and devices are added to computing system 1 that share a common DMA table.

The third method can be applied to either of the first two methods to provide further optimization.

Figure 11:
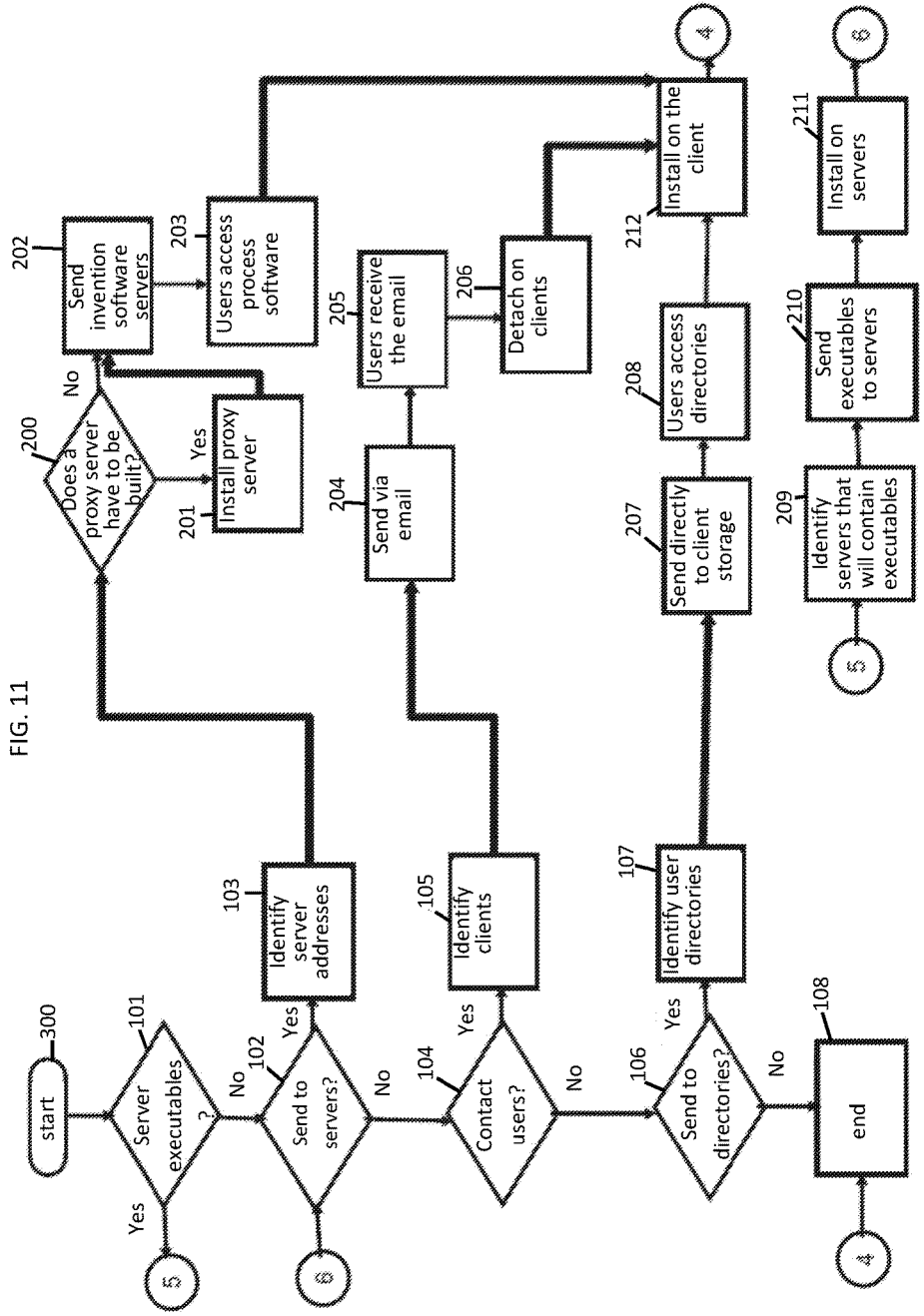
FIG. 11 is a flow diagram illustrating a deployment process of the computer program product of FIGS. 5-10.

In accordance with embodiments and, with reference to FIG. 11, a deployment process of the computer program product described above is provided. The process begins at block 300 and at block 101 with a determination of whether the first-eleventh program instructions 501-511 will reside on server 15 when executed. If so, then the server 15 is identified at block 209. The first-eleventh program instructions 501-511 are then transferred directly to the server 15 storage via FTP or some other protocol or by copying though the use of a shared file system at block 210 such that the first-eleventh program instructions 501-511 are installed on the servers at block 211.

Next, a determination is made on whether the first-eleventh program instructions 501-511 are to be deployed by having users access to the first-eleventh program instructions 501-511 on server 15 at block 102. If so, the server 15 addresses that will store the first-eleventh program instructions 501-511 are identified at block 103 and a determination is made if a proxy server is to be built at block 200 for storage. A proxy server is a server that sits between a client application, such as a Web browser, of first computing device 11 and server 15 and operates by intercepting all requests to the server 15 to see if it can fulfill the requests itself (see, e.g., remote web server 15a of FIGS. 2 and 3). If not, the proxy server forwards the request to server 15. The two primary benefits of a proxy server are to improve performance and to filter requests.

If a proxy server is required, then the proxy server is installed at block 201 and the first-eleventh program instructions 501-511 are sent via a protocol, such as FTP, or by being copied directly from the source files to the server 15 files via file sharing at block 202. Another embodiment involves sending a transaction to the (one or more) server 15 that contained the process software, and have the server 15 process the transaction and then receive and copy the process software to the server 15 file system. Once the process software is stored, the users may then access the first-eleventh program instructions 501-511 and copy to the same to their respective client computer file systems at block 203. Alternatively, the server 15 may automatically copy the first-eleventh program instructions 501-511 to each client and then run an installation program for the first-eleventh program instructions 501-511 on each client computer whereby the user executes the program that installs the first-eleventh program instructions 501-511 on his client computer at block 212 and then exits the process at block 108.

At block 104, a determination is made as to whether the first-eleventh program instructions 501-511 are to be deployed by being sent to users via e-mail. If a result of the determination is affirmative, the set of users are identified together with the addresses of the user client computers at block 105 and the first-eleventh program instructions 501-511 are sent via e-mail to each of the users' client computers. The users then receive the e-mail at block 205 and detach the first-eleventh program instructions 501-511 from the e-mail to a directory on their client computers at block 206. The user executes the program that installs the first-eleventh program instructions 501-511 on his client computer at block 212 and then exits the process at block 108.

Lastly, a determination is made on whether the first-eleventh program instructions 501-511 will be sent directly to user directories on their client computers at block 106. If so, the user directories are identified at block 107 and the process software is transferred directly to the user's client computer directories at block 207. This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the first-eleventh program instructions 501-511 at block 208, execute the program that installs the first-eleventh program instructions 501-511 at block 212 and then exit the process at block 108.

Figure 12:
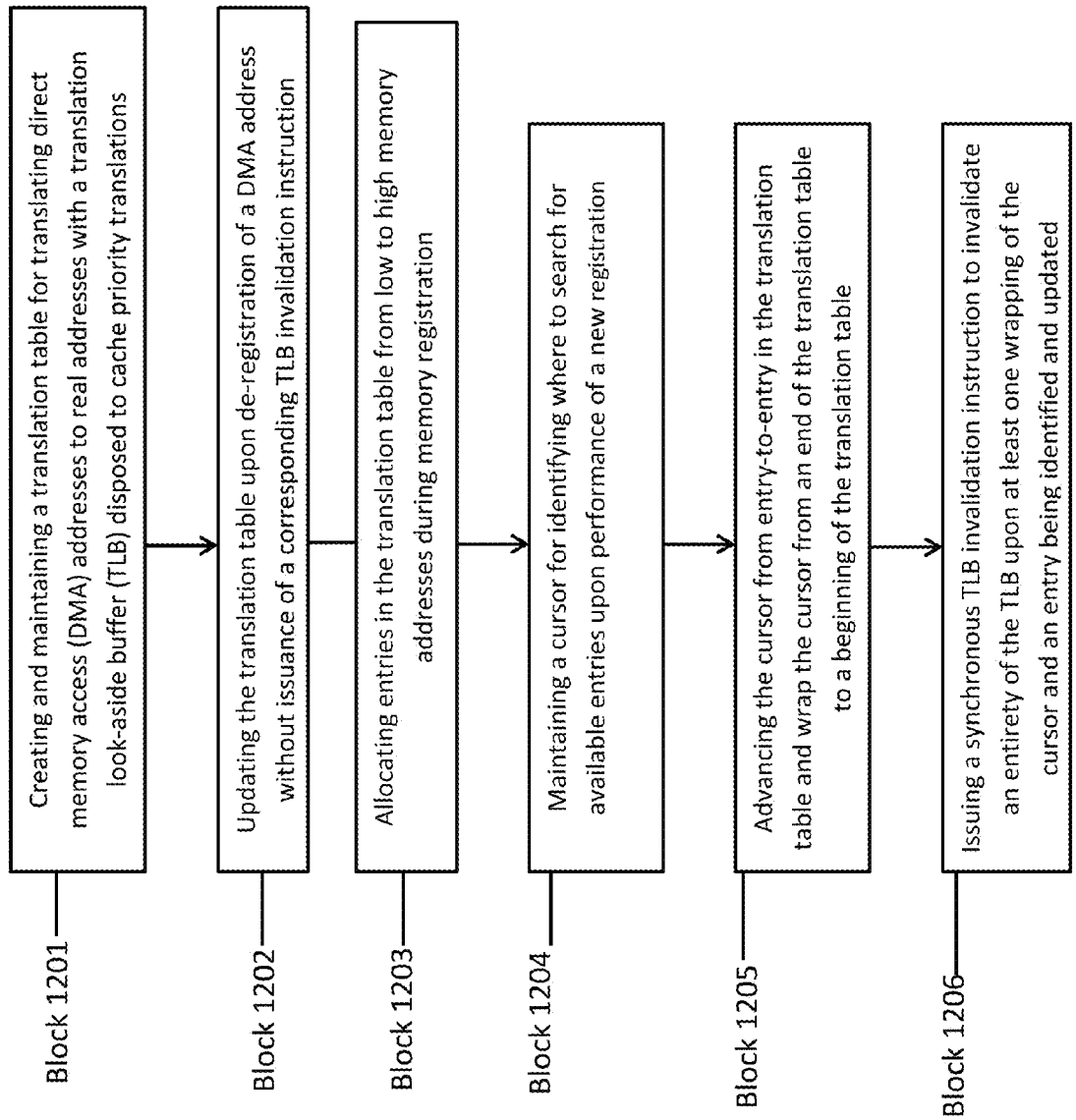
FIG. 12 is a flow diagram illustrating a computer-implemented method of page table manipulations.

With reference to FIG. 12, a computer-implemented method for optimizing page table manipulations is provided. The computer-implemented method includes creating and maintaining a translation table for translating direct memory access (DMA) addresses to real addresses with a translation look-aside buffer (TLB) disposed to cache priority translations at block 1201, updating the translation table upon de-registration of a DMA address without issuance of a corresponding TLB invalidation instruction at block 1202, allocating entries in the translation table from low to high memory addresses during memory registration at block 1203, maintaining a cursor for identifying where to search for available entries upon performance of a new registration at block 1204, advancing the cursor from entry-to-entry in the translation table and wrap the cursor from an end of the translation table to a beginning of the translation table at block 1205 and issuing a synchronous TLB invalidation instruction to invalidate an entirety of the TLB upon at least one wrapping of the cursor and an entry being identified and updated at block 1206.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for optimizing page table manipulations, the computer program product comprising a computer readable storage medium having program instructions embodied therewith, the program instructions being readable and executable by a processing circuit to cause the processing circuit to:
   create and maintain a translation table for translating direct memory access (DMA) addresses to real addresses with a translation look-aside buffer (TLB) disposed to cache priority translations;
   update the translation table upon de-registration of a DMA address without issuance of a corresponding TLB invalidation instruction;
   allocate entries in the translation table from low to high memory addresses during memory registration;
   maintain a cursor for identifying where to search for available entries upon performance of a new registration;
   advance the cursor from entry-to-entry in the translation table and wrap the cursor from an end of the translation table to a beginning of the translation table; and
   issue a synchronous TLB invalidation instruction to invalidate an entirety of the TLB upon at least one wrapping of the cursor and an entry being identified and updated.

2. The computer program product according to claim 1, wherein the program instructions further cause the processing circuit to:
   issue an asynchronous TLB invalidation instruction upon de-registration of a DMA address; and
   delay issuance of the synchronous TLB invalidation instruction until a first registration following the at least one wrapping.

3. The computer program product according to claim 2, wherein the program instructions further cause the processing circuit to map host memory and DMA address translations for all host memory areas provided to each of multiple callers.

4. The computer program product according to claim 3, wherein the program instructions further cause the processing circuit to add device usage information to the host memory and DMA address translations.

5. The computer program product according to claim 4, wherein the device usage information comprises a single device identifier and a bit mask.

6. The computer program product according to claim 4, wherein the device usage information is initialized during the new registration and updated when requests are issued to the corresponding one of the multiple callers.

7. The computer program product according to claim 4, wherein the program instructions further cause the processing circuit to issue the asynchronous TLB invalidation instruction in accordance with the device usage information.

8. A computing system for optimizing page table manipulations, the computing system comprising a computer readable storage medium having instructions stored thereon that are executable by a processing circuit to cause the processing circuit to:
   create and maintain a translation table for translating direct memory access (DMA) addresses to real addresses with a translation look-aside buffer (TLB) disposed to cache priority translations;
   update the translation table upon de-registration of a DMA address without issuance of a corresponding TLB invalidation instruction;

allocate entries in the translation table from low to high memory addresses during memory registration;

maintain a cursor for identifying where to search for available entries upon performance of a new registration;

advance the cursor from entry-to-entry in the translation table and wrap the cursor from an end of the translation table to a beginning of the translation table; and issue a synchronous TLB invalidation instruction to invalidate an entirety of the TLB upon at least one wrapping of the cursor and an entry being identified and updated.

9. The computing system according to claim 8, wherein the instructions further cause the processing circuit to:

issue an asynchronous TLB invalidation instruction upon de-registration of a DMA address; and delay issuance of the synchronous TLB invalidation instruction until a first registration following the at least one wrapping.

10. The computing system according to claim 9, wherein the instructions further cause the processing circuit to map host memory and DMA address translations for all host memory areas provided to each of multiple callers.

11. The computing system according to claim 10, wherein the instructions further cause the processing circuit to add device usage information to the host memory and DMA address translations.

12. The computing system according to claim 11, wherein the device usage information comprises a single device identifier and a bit mask.

13. The computing system according to claim 11, wherein the device usage information is initialized during the new registration and updated when requests are issued to the corresponding one of the multiple callers.

14. The computing system according to claim 11, wherein the instructions further cause the processing circuit to issue the asynchronous TLB invalidation instruction in accordance with the device usage information.

15. A computer-implemented method for optimizing page table manipulations, comprising:

creating and maintaining a translation table for translating direct memory access (DMA) addresses to real addresses with a translation look-aside buffer (TLB) disposed to cache priority translations;

updating the translation table upon de-registration of a DMA address without issuance of a corresponding TLB invalidation instruction;

allocating entries in the translation table from low to high memory addresses during memory registration;

maintaining a cursor for identifying where to search for available entries upon performance of a new registration;

advancing the cursor from entry-to-entry in the translation table and wrap the cursor from an end of the translation table to a beginning of the translation table; and issuing a synchronous TLB invalidation instruction to invalidate an entirety of the TLB upon at least one wrapping of the cursor and an entry being identified and updated.

16. The computer-implemented method according to claim 15, further comprising:

issuing an asynchronous TLB invalidation instruction upon de-registration of a DMA address; and delaying issuance of the synchronous TLB invalidation instruction until a first registration following the at least one wrapping.

17. The computer-implemented method according to claim 16, further comprising mapping host memory and DMA address translations for all host memory areas provided to each of multiple callers.

18. The computer-implemented method according to claim 17, further comprising adding device usage information to the host memory and DMA address translations to the mapping.

19. The computer-implemented method according to claim 18, wherein the device usage information comprises a single device identifier and a bit mask, is initialized during the new registration and is updated when requests are issued to the corresponding one of the multiple callers.

20. The computer-implemented method according to claim 18, further comprising issuing the asynchronous TLB invalidation instruction in accordance with the device usage information.

* * * * *